United States Patent [19]

Guimbal

[11] 4,115,712
[45] Sep. 19, 1978

[54] HIGH POWER AND HIGH SPEED LINEAR MOTOR

[75] Inventor: Jean Guimbal, Saint-Etienne, France

[73] Assignee: Agence Nationale de Valorisation de la Recherche (ANVAR), France

[21] Appl. No.: 736,132

[22] Filed: Oct. 27, 1976

[30] Foreign Application Priority Data

Oct. 30, 1975 [FR] France .................. 75 34533

[51] Int. Cl.² ............................................. H02K 41/02
[52] U.S. Cl. ............................... 310/12; 310/13; 104/148 LM; 104/148 MS
[58] Field of Search ..................... 310/12–14; 104/148 R, 148 LM, 148 MS

[56] References Cited

U.S. PATENT DOCUMENTS

| 2,041,607 | 5/1936 | Hopkins | 104/148 LM |
| 3,308,312 | 3/1967 | Ehrenberg | 310/13 |
| 3,374,823 | 3/1968 | Ford | 310/13 X |
| 3,802,349 | 4/1974 | Guimbal | 104/148 LM |
| 3,911,828 | 10/1975 | Schwärzlev | 310/13 X |
| 3,967,561 | 7/1976 | Schwärzlev | 310/13 X |

*Primary Examiner*—Donovan F. Duggan
*Attorney, Agent, or Firm*—Robert E. Burns; Emmanuel J. Lobato; Bruce L. Adams

[57] ABSTRACT

An electric linear motor of the axial type comprising a fixed armature formed by an elongate rail of U-shaped cross section comprising magnetic and electrically conductive material, and a mobile, elongate inductor disposed between the arms of the U. The inductor comprises an elongate magnetic core of square cross section surrounded along its length by a plurality of successive, coaxial, electrically energizable coils without magnetic components interposed between the ends of adjacent coils. Between these ends are air gaps communicating with air passages extending through each coil for cooling air to be propelled therethrough.

12 Claims, 4 Drawing Figures

HIGH POWER AND HIGH SPEED LINEAR MOTOR

BACKGROUND OF THE INVENTION

The present invention relates to a high power and high speed linear motor. A particularly economical linear motor is already known comprising rectangular for example square coils separated by magnetic strips around a core which is equally square or rectangular and an armature of U or approximately U-shape which encloses the prismatic bar thus formed. This motor of particular geometry has been developed under the name of an axial motor.

As regards their inductive part, conventional electrical motors, whether rotary or linear, are always designed with a magnetic circuit able to receive the electrical winding. To this end, it may be provided either with teeth or, as in axial motors, it may have a structure which leaves room for the coils between the magnetic parts.

Naturally, the conducting parts must be insulated and since they are the cause of considerable heating, they must be cooled. A fine structure which combines electrical and magnetic parts, taking these two imperatives into account, firstly leads to considerable wastage of space and secondly introduces a limitation in the cooling power. Nevertheless, this is normally accepted owing to the necessity of passing the magnetic flux through the windings.

High power and high speed motors have a special construction in this respect because they are well-suited to the large gaps between the parts of the magnetic circuit which constitute the armature on the one hand and the inductor on the other hand. From another point of view, they pose particularly acute problems of cooling, linked with the fact that they are subject to frequent starting.

SUMMARY OF THE INVENTION

The invention relates to a new structure which is well-suited to these requirements. In fact, it consists of completely separating the conducting and magnetic parts of the inductor, the former, as in a transformer, forming a sort of cylindrical layer around the latter. But, as has been seen, the latter differs from the magnetic part of a transformer in it comprises the conducting parts.

To this end, this invention relates to a linear electric motor comprising an inductor whose coils of rectangular section surround a longitudinal core, and a U-shaped armature surrounding this inductor, characterised in that in their entirety the coils form a conducting layer around the core, through which the magnetic flux passes, without the interposition of magnetic parts between the coils or parts of successive coils.

Another feature of high power and high speed linear motors, which is linked with the necessity of providing considerable peaks of force, in particular during starting, is that they must have reduced magnetic leakages. These magnetic leakages are as low as possible when the conducting parts of the armature and inductor are face-to-face. In the case of an axial motor, this cannot be so, because the layer of conducting parts of the inductor is cylindrical, whereas the conducting layer of the armature is of U-shape. It is known to resolve this problem by means of a third conducting system which is the seat of opposing induced currents and which is constituted by the actual support of the inductor.

In the particular case of powerful and high speed motors, the longitudinal currents which develop in the armature assume considerable importance and if sufficient space is not preserved for them and the opposing currents of the support, the losses become too great.

To remedy this drawback, according to an additional feature of the invention, the armature describes a U whose depth is clearly greater than the height of the induction coils, the conducting support of the inductor also has a U-shape, and the total height of the coils and of the inductor support is substantially equal to the depth of the U constituting the armature.

According to one variation of the invention, which provides less bulk as regards height and less serious results due to an incident in the case of being blocked by snow, hail etc. of the U-shaped fixed armature placed along the track, the height of the magnetic part of the U constituting the armature remains substantially equal to the height of the coils and an excess length of the conducting part of the armature is folded back on the outside along the magnetic part, the arms of the conducting support of the inductor being folded back in the same way in order to give the latter a general inverted U-shape.

In the axial motor according to the invention, the magnetic strips, generally provided between the successive coils for conducting the magnetic flux between the core and the magnetic part of the armature have been eliminated. The elimination of these strips certainly increases the ampere-turns consumed by the air gap but on the other hand, one thereby considerably increases the space available for the winding and consequently the number of ampere-turns which the coils may produce. In fact, for high power and high speed motors, it is possible to increase these ampere-turns in a proportion clearly greater than the additional ampere-turns consumed by the air gap. In fact, in these motors, the elimination of the magnetic strips makes it possible to replace several narrow coils by a single wide coil and one thus gains several times the width of two insulators which separate each coil from the adjacent magnetic strips. In all, it is possible to virtually double the space available for the copper fittings, such that for the same current density, it is possible to virtually double the ampere-turns produced, whereas the resulting increase in the air gap clearly less than doubles the ampere-turns consumed by this air gap.

One finally achieves a very favorable overall balance giving a better power factor and better efficiency than those obtained with known motors.

Furthermore, the elimination of the magnetic strips between the coils gives great freedom for the circulation of cooling air and greatly increases the thrust which the motor may produce for given heating. The result of this is that the thrust/weight ratio is much more favorable. The prototype of the motor according to the invention makes it possible to obtain a thrust of 3000 daN for a weight of 800 daN, whereas for the same thrust, current motors weigh between 3000 and 4000 daN.

BRIEF DESCRIPTION OF THE DRAWINGS

Various embodiments of the present invention will be described hereafter as non-limiting examples, with reference to the accompanying drawings in which.

DESCRIPTION OF THE PREFERRED EMBODIMENTS

Figure 2:
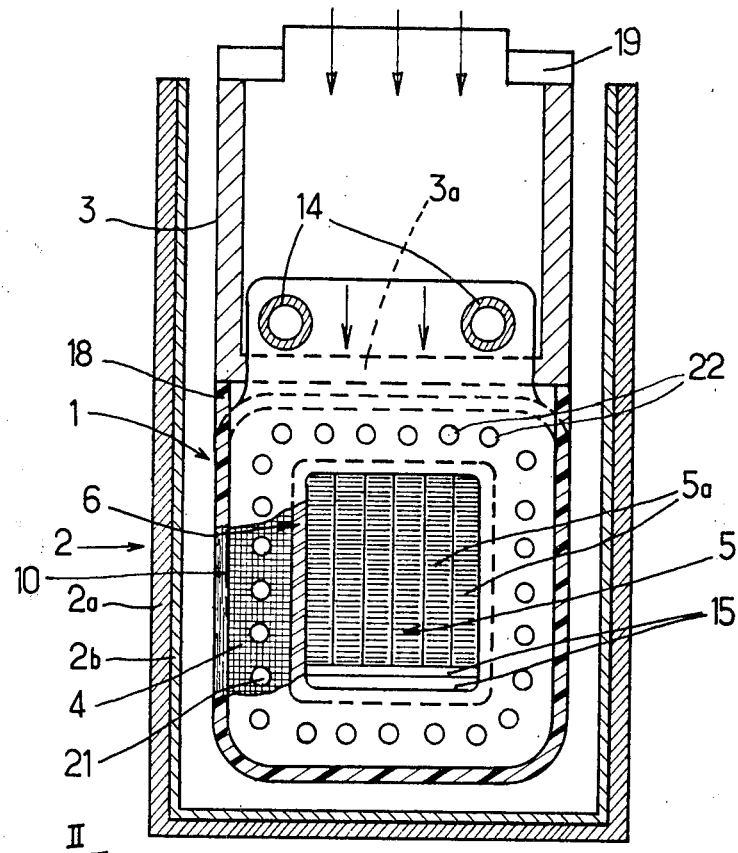
FIG. 2 is a cross-sectional view taken on line II—II of FIG. 1.
Figure 1:
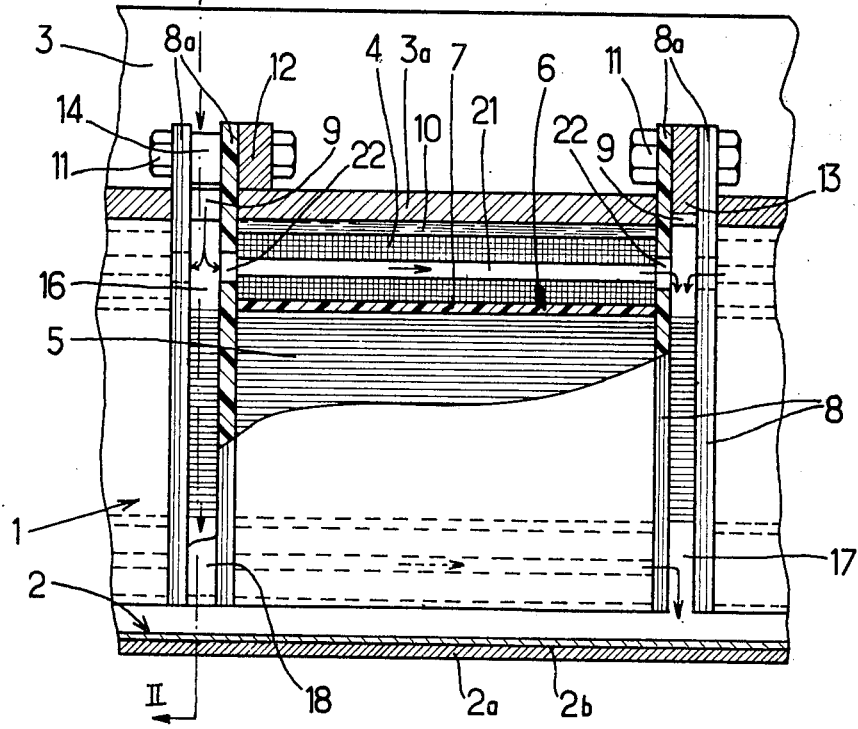
FIG. 1 is a partial elevational view, partly in longitudinal section, of a high power and high speed linear motor according to the invention.

The linear motor of axial type shown in FIGS. 1 and 2 comprises an inductor 1 integral with a moving body moving along a track on which a fixed armature unit or armature 2 is mounted having a cross section in the shape of a U open at the top. However, this arrangement is given solely as an illustration and the invention also applies to a reversed arrangement, i.e. an arrangement in which the inductor 1 is fixed and the armature 2 is movable. The armature 2 of U-shaped cross section may either be completely conductive and magnetic (steel) or comprise an outer part 2a of steel and an inner layer 2b of a material conducting electricity (aluminum for example).

The inductor unit or inductor 1 comprises a support 3 constituted by a longitudinal sectional member of U-shaped cross section open at the top. This support is made from a conducting material, aluminum for example. Suspended below the support 3 is an arrangement constituted by a system of successive coils 4 coaxially placed around a common longitudinal core 5. Each coil 4 is wound on a carcass 6 of insulating material comprising a longitudinal mandrel 7, of rectangular, for example square section, threaded on the core 5 and two transverse cheeks 8 constituting flanges extending towards the outside from the ends of the central mandrel 7. Each coil 4 is in fact mounted like a transformer winding. This coil is insulated on the outside by a layer 10 of stratified type (mat of glass fibres).

To ensure the suspension of the arrangement formed by the central core 5 and the successive coils 4, the cheeks 8 of the latter are provided at their upper part with extensions 8a which are engaged in horizontal and transverse slots 9 provided in the lower web 3a of the support 3. The extensions 8a project inside the support 3, above its web 3a and they are fixed by means of screws 11 passing through holes provided in these extensions 8a, to transverse bars 12 and 13 integral with the support 3.

The pairs of flanges 8 of successive coils are mounted alternately in a slightly different manner. In the left-hand part of FIG. 1, the bar 12 is offset with respect to the slot 9 and is located at the rear of the extension 8a of the right-hand flange. In the vicinity of each screw a sleeve 14 is placed between the two extensions 8a in order to leave a free passageway between the two extensions, to facilitate the passage of cooling air, as will be seen hereafter. On the other hand, as can be seen from the right-hand part of FIG. 1, the following pair of extensions 8a is secured in a different manner: in this case, the transverse bar 13 is engaged between the two extensions 8a and fulfils the function of a cross piece preventing the passage of air at this point. The bar 13 extends through the slot 9.

According to one variation, the flanges 8 which serve for securing successive coils 4, could be detachable metal plates: in this case, they should nevertheless be split so as not to constitute short-circuiting turns around the core.

In order to prevent losses which are too great, due to the part of the magnetic flux which is enclosed by the base of the U constituted by the armature and which consequently leaves the core 5 in a substantially vertical direction, according to a feature of the invention, this core 5 is sub-divided into several basic narrow cores 5a, each constituted by the superimposition of narrow magnetic strips, these basic narrow cores 5a being slightly insulated from each other by being wound round with insulating tape. The planes of separation of the basic cores are vertical, as is shown in FIG. 2.

In order to retain the basic cores 5a inside the sleeve 7 of the carcass 6, wedges 15 are inserted by force between the basic cores 5a and the sleeve 7.

As can be seen from the preceding description, the fact that the inductor 1 is free of the aforementioned magnetic strips previously inserted between the successive coils 4 for conducting magnetic flux between the core and the armature. This makes it possible to considerably increase the space available for the winding formed by these coils 4 and consequently the ampere-turns provided. This elimination of the strips also provides great freedom for the circulation of cooling air which constitutes a particularly critical problem in view of the appreciable increase in the motor according to the invention, of the quantity of copper subject to the liberation of heat by the Joule effect.

As shown in FIG. 1, the successive coils 4 and more particularly their front flanges 8 are separated by small airgaps 16, 17. The gap 16, which is provided between the pair of left-hand flanges 8, in FIG. 1, is closed on its two vertical sides and on its lower side by a cover 18 of U-shaped cross section, extending between the two flanges 8 as far as the lower side of the support 3. On the other hand, the other airgap 17, which is located between the flanges 8 located on the right-hand side of FIG. 1, is open on all sides, except at its upper part, where this gap is closed-off by the transverse bar 13.

Furthermore, the U-shaped support 3 is closed at its upper part by a cover 19 provided with an opening of large dimensions, connected to the outlet orifice of a fan which is not shown.

The inside of the support 3 is thus permanently at excess pressure.

To ensure cooling of the various coils 4, the latter have one or more gaps between the layers of turns, forming longitudinal conduits 21 opposite which holes 22 are provided in the flanges 8. The cooling conduits 21 may be provided either on four sides of the coil, or on only certain of the latter.

Consequently, the cooling air under pressure contained in the support 3 flows vertically through the extensions 8a of the left-hand flanges 8, defining an open passage between the latter, then penetrates towards the right and left in the cooling conduits 21, thus passing through the holes 22 provided in the flanges 8. The air cannot escape to the outside at this point, since the gap 16 is closed by the cover 18. When the cooling air has passed through the conduits 21, it flows into the adjacent gap 17, passing through the holes 22 in the flanges 8 and escapes to the outside from this point. Very effective discharge of the heat liberated during operation is thus obtained.

The electric linear motor according to the invention may be supplied with single-phase or polyphase electrical current. The part of the winding corresponding to one pole and one phase may form a single coil or it may be sub-divided into two or three basic coils in order to facilitate coupling changes intended to achieve several speeds of synchronism.

Figure 3:
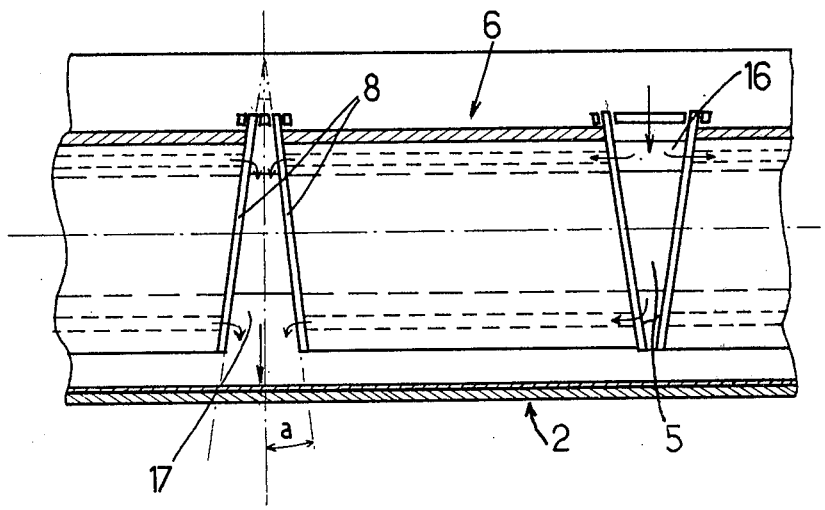
FIG. 3 is a partial elevational view in longitudinal section, of a variation of the linear motor according to the invention.

In the variation illustrated in FIG. 3, the flanges 8 of the carcass 6 are not perpendicular to the longitudinal axis of the motor, but on the contrary inclined with respect to a transverse plane by an angle $a$ which may be of the order of 10° for example. This particular arrangement makes it possible to save additional space and to bring the coils closer together, hence an increase in the total number of ampere-turns available. The maximum width of the gaps between the flanges 8 is located adjacent overlying support for the inlet of cooling air (shown here at left) and on the opposite side, i.e. the side directed towards the web of the armature 2, for the outlet of air.

Figure 4:
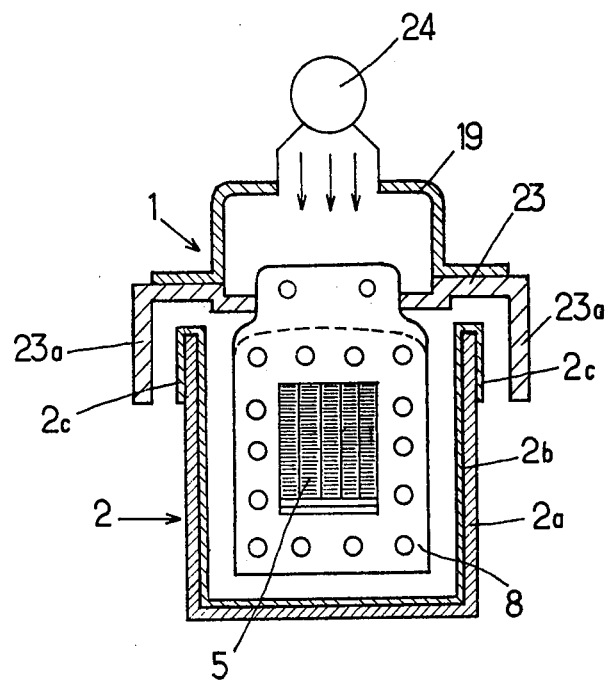
FIG. 4 is a cross-sectional view of another variation of the linear motor according to the invention.

In the variation illustrated in FIG. 4, the height of the armature 2 is less than that of the motor shown in FIGS. 1 and 2. This arrangement is of particular interest when the armature is fixed and placed along the track. In fact, the risk of incidents due to blockage of the armature by hail, snow etc. are appreciably reduced, owing to the reduction in height of this armature.

In this embodiment, the inner layer 2b of conducting material (aluminum) is extended by an outer excess length 2c extending towards the bottom along the sides of the armature 2, over a certain distance.

The support 23 for the inductor, made from conducting material (aluminum), has a cross section in the shape of an inverted U, the two arms 23a of which extend downwards opposite outer excess lengths 2c of the conducting material of the armature 2. FIG. 4 shows the arrangement of the cover 19 mounted on a fan 24 ensuring cooling of the motor, in the manner afore-described.

The features of a linear motor according to the invention which has produced particularly remarkable results will be given hereafter by way of example and in a non-limiting manner.

This motor comprises an inductor having a total weight of 750 daN, constituted by a magnetic core whose cross-sectional dimensions are 100 × 100mm and whose length is 4.5m, and 24 coils each 18 centimeters long and whose cross section is 160 × 160mm, each coil comprising 24 turns, each having a copper section of 100mm². This inductor is supplied with alternating current at 50 Hz, at a voltage of 670 Volts. The armature is constituted by an outer metal sheet having a thickness of 12mm, coated on the inside with a layer of aluminium having a thickness of 5mm. It is 30 centimeters high and 20 centimeters wide.

This motor makes it possible to obtain a thrust of 2000 daN at 166 Kilometers/hour, whereas to achieve this same result with a motor of known type, the latter would weigh between 3000 and 4000 daN. The motor according to the invention, subjected to tests, has a capacity of 0.71 and a power factor of 0.76. The current consumed which is inversely proportional to the product of these two magnitudes is thus half less in the motor according to the invention, with respect to known motors which have capacities and power factors of the order of 0.5.

What is claimed is:

1. A linear electric motor, comprising: an inductor unit having a system of coaxial coils each having a generally rectangular cross-section, the coils being longitudinally spaced apart by free spaces, the inductor unit also having a longitudinally extending core common to the coils and surrounded by them, the inductor unit being free of magnetic parts interposed on the system of coils; an armature unit of U-shaped cross-section surrounding the inductor unit so that the system of coils constitutes an electrically conducting layer between the core and the armature, through which layer a magnetic flux induced by the inductor passes, for moving one of the units along the other without any conduction of the flux through any local portions of the system of coils, the coils having longitudinal passages extending through them between the free spaces; and means for circulating cooling air through the passages in the coils and through the free spaces.

2. A motor according to claim 1, in which the inductor unit includes a support of U-shaped cross section consisting of an electrically conducting material, with vertical arms parallel to end parts of the armature unit of U-shaped cross section.

3. A motor according to claim 1, in which the inductor unit includes a support having a section in the shape of an inverted U, of an electrical conducting material, covering the upper part of the armature unit of U-shaped cross section, this armature comprising on its inner side, a conducting layer and on its outer side an excess length which extends over upper parts of the armature unit, which parts are located oposite the downwardly extending arms of the inverted U-shaped support.

4. A motor according to claim 1, connected in use in an alternating circuit, and in which a part of the inductor which corresponds to one pole and one phase of the circuit forms a single one of the coils.

5. A motor according to claim 1, in which each coil has an insulating carcas on which it is wound and which comprises a longitudinal mandrel and at the ends of the latter, two parallel flanges, these flanges being transverse to a longitudinal axis of the motor.

6. A motor according to claim 1, connected in use in an alternating circuit, and in which a part of the inductor constituting a pole and phase coil is sub-divided into several coils to allow coupling changes and to obtain several speeds of synchronism.

7. A motor according to claim 2, in which the core is secured to the support of the inductor unit, the inductor having plates placed between the coils, surrounding the core, and each having an extension which passes through a transverse slot in the support, and having members integral with the support, whereto the extension is fixed.

8. A motor according to claim 7, in which the inductor unit includes a carcass on which the coils are wound, and in which the plates constitute flanges on the carcass.

9. A motor according to claim 8, in which alternating first and second ones of the free spaces are disposed between the flanges of successive coils and are alternately closed and open on their peripheries, the longitudinal passages in the coils being located opposite holes provided in the flanges, the first free spaces being closed at the periphery of the flanges and having upper parts connected through the slots of the support through which the extensions of the flanges pass, an inside of the support having a second cover, covering it, and the second free spaces being connected freely to the outside and being closed-off in upper parts thereof, in the region of the slots of the support.

10. A motor according to claim 9, having cross-pieces in the vicinity of the slots, whereby the extensions of two adjacent flanges are spaced apart, the support having transverse bars integral therewith and located adjacent the slots, the flanges being fixed to the transverse bars.

11. A motor according to claim 8, in which the flanges of the coils are inclined with respect to a longitudinal axis of the inductor unit, the inclination being alternately converging on one and the other side of the inductor for successive coils and being such that a maximum width of one of the free spaces is located adjacent the means for circulating cooling air.

12. A motor according to claim 11, in which the core is sub-divided into basic cores of narrow straight rectangular section, each constituted by a pile of narrow magnetic tape, the basic cores being insulated from each other so that their juxtaposition produces the equivalent of a second lamination, along planes parallel to the sides of the armature unit of U-shaped cross-section, the core comprised by the basic core having wedges whereby it is clamped to the coils.

* * * * *